US005620671A

United States Patent [19]

Shoemaker

[11] Patent Number: 5,620,671
[45] Date of Patent: Apr. 15, 1997

[54] LIQUID DISPENSING APPARATUS

[75] Inventor: Donald P. Shoemaker, Birchrunville, Pa.

[73] Assignee: BetzDearborn Inc., Trevose, Pa.

[21] Appl. No.: 600,439

[22] Filed: Feb. 13, 1996

Related U.S. Application Data

[63] Continuation of Ser. No. 350,880, Dec. 7, 1994, abandoned.

[51] Int. Cl.[6] .......... B01D 11/02

[52] U.S. Cl. .......... 422/261; 222/189.06; 222/189.1; 222/533; 239/310; 422/266; 422/269

[58] Field of Search .......... 239/310; 222/189.06, 222/189.1, 533, 400.7; 422/261, 266, 269

[56] References Cited

U.S. PATENT DOCUMENTS

| | | | |
|---|---|---|---|
| 3,386,808 | 6/1968 | Handeland | 23/272.7 |
| 4,832,237 | 5/1989 | Hurford, Jr. | 222/464 |
| 4,948,013 | 8/1990 | Thomas et al. | 222/1 |
| 5,320,288 | 6/1994 | Ketcham, Jr. | 239/316 |
| 5,468,377 | 11/1995 | Clavin et al. | 210/167 |
| 5,525,241 | 6/1996 | Clavin et al. | 210/753 |

OTHER PUBLICATIONS

Betz Bio–Trol® Product Facts, PFC5239308 by Betz Industrial, 1993.
Betz Ultra–Brom® 36, Equipment Installation Information, Bulletin No. 901, by Betz Industrial, 1993.
Betz Industrial Ultra–Brom® Service, Bulletin 884, by Betz Industrial, 1992.
Betz Ultra–Brom® 48, Solid Halogen Feeder, EF 4–03 9303, Betz Laboratories, Inc. 1993.

*Primary Examiner*—Robert J. Warden
*Assistant Examiner*—Krisanne M. Thornton
*Attorney, Agent, or Firm*—Alexander D. Ricci; Matthew W. Smith

[57] ABSTRACT

An apparatus mountable atop a container having a cavity containing a solid material, an orifice positioned atop the container and a liquid inlet. The apparatus has a collar having an axial bore, a pivotable conduit attached to the collar and a diffuser attached to the conduit. The apparatus ensures that solid material within the container remains flooded during dispensing of liquid from the container and provides convenient accessibility to the diffuser for removal, inspection and replacement. The apparatus is particularly well suited for dispensing of liquids containing solid halogen donor materials from solid halogen donor containers.

6 Claims, 3 Drawing Sheets

LIQUID DISPENSING APPARATUS

This is a continuation of application Ser. No. 08/350,880, filed Dec. 7, 1994, now abandoned.

FIELD OF THE INVENTION

The present invention relates to the flow of liquids and more particularly to an apparatus for dispensing liquids from a container.

BACKGROUND OF THE INVENTION

Although the present invention has general applicability to any mechanical system in which a solid material is dissolved in a liquid and the liquid is dispensed from a container, the invention will be discussed in detail as it concerns a solid halogen donor delivery system.

The formation of slimes by microorganisms is encountered in both naturally occurring bodies of water such as ponds, lakes, lagoons and streams as well as in confined aqueous systems such as cooling towers, boilers, air washer systems, pulp and paper mills and the like. All possess conditions which are conducive to the growth and reproduction of slime-forming microorganisms. In both once-through and recirculating cooling systems, for example, which employ large quantities of water as a cooling medium, the formation of slime by microorganisms is an extensive and constant problem.

Airborne organisms are readily entrained in the water from cooling towers and find this warm medium an ideal environment for growth and multiplication. Aerobic and heliotropic organisms colonize and grow in such areas as the tower sump and the piping and passages of the cooling system. The slime formation not only aids in the deterioration of the tower structure in the case of wooden towers, but also promotes corrosion when it deposits on metal surfaces. Slime carried through the cooling system plugs and fouls lines, valves, strainers, etc., and deposits on heat exchange surfaces. In the latter case, the impedance of heat transfer can greatly reduce the efficiency of the cooling system.

In pulp and paper mill systems, slime formed by microorganisms is commonly encountered and causes fouling, plugging or corrosion of the system resulting in work stoppages and the loss of production time. Slime is also responsible for unsightly blemishes in the final product, which result in rejects and wasted output.

The previously discussed problems have resulted in the extensive utilization of bactericides in aqueous systems to control bacteria. One treatment for microorganism control is to add halogen to the affected aqueous system. Gaseous halogens can be added to the system, however gaseous systems are subject to halogen gas leaks which are hazardous to personnel. An alternative to using gaseous halogen is to use solid, halogen donor chemicals that release active halogen (usually bromine or chlorine) when dissolved in water. After release, the halogen reaction on the target microorganisms is similar to that from other halogen sources. Typical solid halogen donors include 1-bromo-3-chloro-5,5-dimethylhydantoin, 1,3-dichloro-5,5, dimethylhydantoin, and sodium dichloroisocyanurate. These donor chemicals do not release the active halogen all at once, but make it slowly available; therefore, they may be considered "controlled release" oxidizing agents. These donors are widely used because of the simplicity, low capital cost, and low installation cost of the feed systems. In addition, because they are solids, they reduce the handling hazards associated with gases (escapement) and liquids (spills).

Solid halogen donor chemicals are usually stored in and dispensed from polymeric containers which are delivered to the treatment site. A typical solid halogen donor delivery system is the Ultra-Brom® 36 system available commercially from Betz Industrial. The polymeric containers have influent water sources near the bottoms of the containers which supply water into the container. The water dissolves the solid halogen donor material and is dispensed from the container into the system to be treated. Typical tanks are re-filled through a resealable orifice and have a side mounted dispensing port through which the water and halogen are dispensed.

Although this arrangement is safer than gaseous halogen systems, this arrangement also has several disadvantages. If the container is filled with a solid halogen donor material to a level higher than the dispensing port, water supplied into the container can wet but not immerse the solid halogen donor material. If wet but not immersed, the solid halogen donor material can release gaseous halogen and heat, which increases the pressure within the tank and associated piping. If a pipe or pipe fitting bursts due to the increased pressure, halogen gas can escape the container causing a toxic hazard to nearby personnel. In addition, because solid halogen donor materials dissolve slowly, it is necessary to utilize a strainer or sieve diffuser to filter out undissolved particulates from the halogenated water stream dispensed from the container. The diffuser is subject to clogging and wear due to the flow of particulates within the container. Mounting a diffuser to side mounted container discharge ports makes the diffuser difficult to remove for inspection and replacement. A side mounted diffuser 101 attached to side mounted port 100 are shown in dashed lines in FIG. 1 to illustrate the problem. As shown in FIG. 1, the only way to remove diffuser 101 is to reach inside tank 11 through orifice 13 to access diffuser 101.

A need therefore exists for a liquid dispensing apparatus which provides flooding of solid halogen donor materials within a container regardless of the donor material height within the container. A need also exists for a liquid dispenser apparatus which provides easy access to the diffuser so inspection and replacement of the diffuser is facilitated.

Accordingly, it is an object of the present invention to provide a liquid dispensing apparatus for attachment to a container wherein solid material within the container is always flooded regardless of the amount of solid donor material within the container. It is also an object of the present invention to provide a liquid dispensing apparatus in which a liquid diffuser is accessible for removal, inspection and replacement.

SUMMARY OF THE INVENTION

To achieve the foregoing and other objects in accordance with purposes of the present invention, as embodied and broadly described herein the invention is a liquid dispensing apparatus mountable atop a container having a cavity containing a solid material, an orifice positioned atop said container and a liquid inlet. The apparatus comprises a container attachment means having a central bore attached to a container orifice; a pivotable liquid outlet means removably attached to the container attachment means and having first and second bores, a liquid outlet port connected to the first bore and a pressure relief port connected to the second bore; and a diffuser means removably disposed within the central bore of the container attachment means and within the first and second bores of the pivotable liquid outlet means. The apparatus is constructed to provide convenient access to the diffuser means for diffuser removal, inspection and replacement and provides constant flooding of solid material within the container.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DESCRIPTION OF THE PREFERRED EMBODIMENTS

Figure 1:
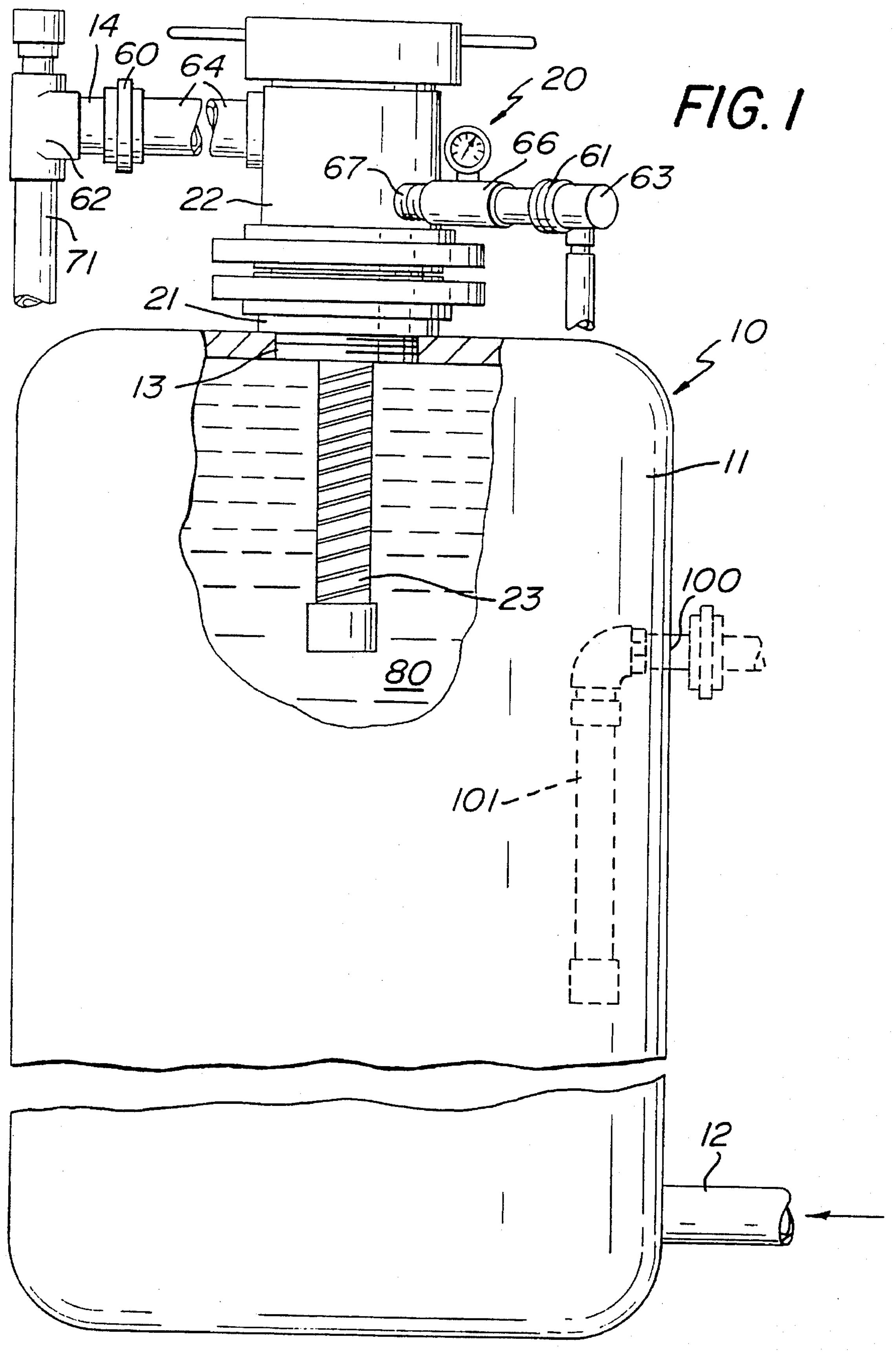
FIG. 1 is a partially cutaway perspective view depicting the liquid dispensing apparatus of the present invention mounted atop a container.

A solid halogen delivery system illustrated generally as 10 in FIG. 1 is comprised of a container 11 having a water inlet 12 and a removable liquid dispensing apparatus illustrated generally as 20 attached to orifice 13 in container 11.

Liquid dispensing apparatus 20 is comprised of a container attachment means 21, a pivotable liquid outlet means 22 and a diffuser means 23.

Figure 2:
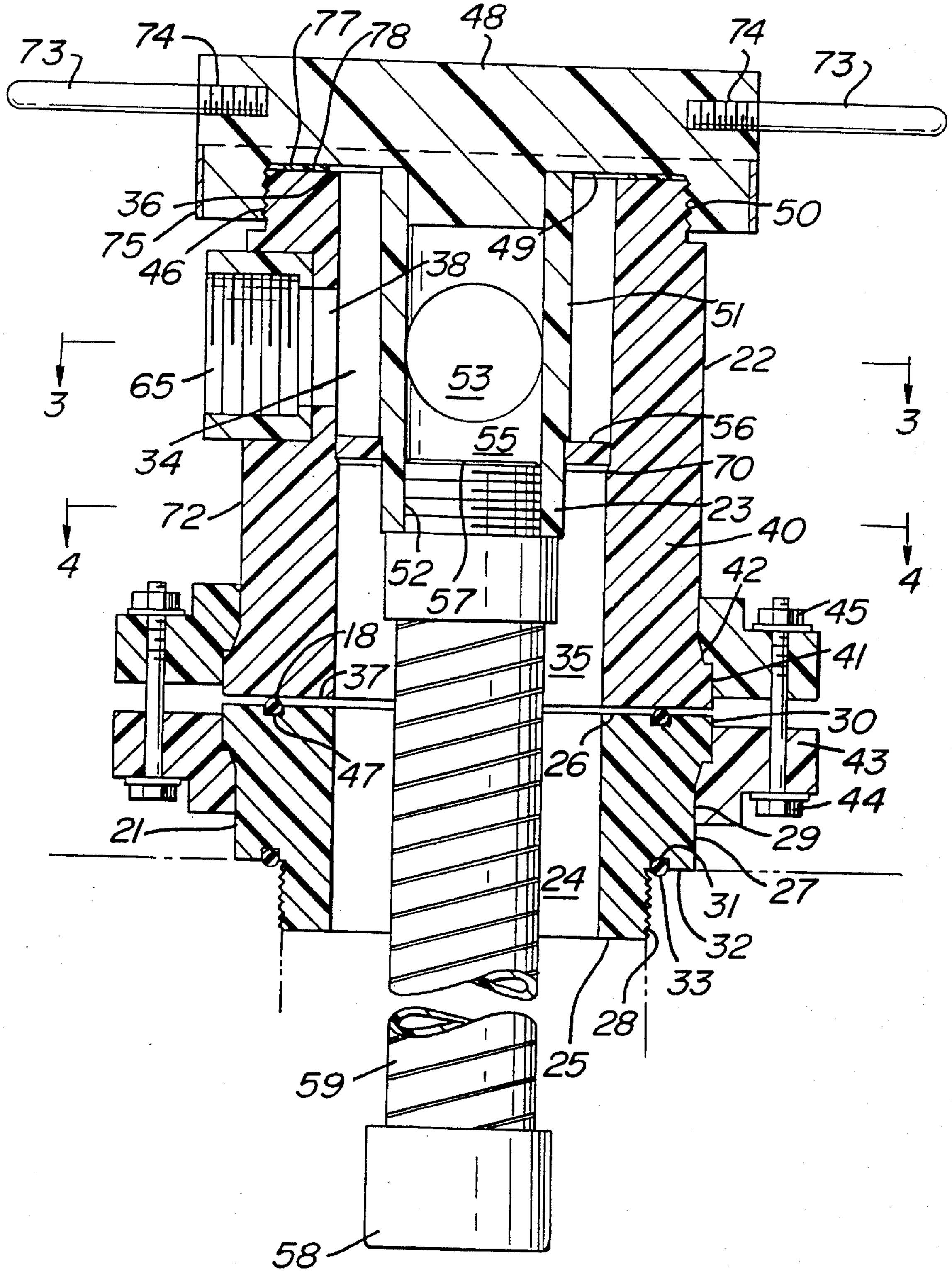
FIG. 2 is a sectional view depicting the liquid dispensing apparatus of the present invention.

As shown in FIG. 2, container attachment means 21 is a collar having an axial bore 24 in fluid communication with tank cavity 80 shown in FIG. 1, a first end 25, a second end 26, and a mid portion 27. The outer surface of the collar has a stepped construction such that the circumference 28 of the first end 25 is smaller than the circumference 29 of mid portion 27, which in turn is smaller than the circumference 30 of second end 26. Circumference 28 is threaded allowing container attachment means 21 to be threadably attached to orifice 13 as shown in FIG. 1. A groove 31 in step 32 between circumferences 28 and 29 contains a gasket 33 to seal the connection of container attachment means 21 to tank 11.

Figure 3:
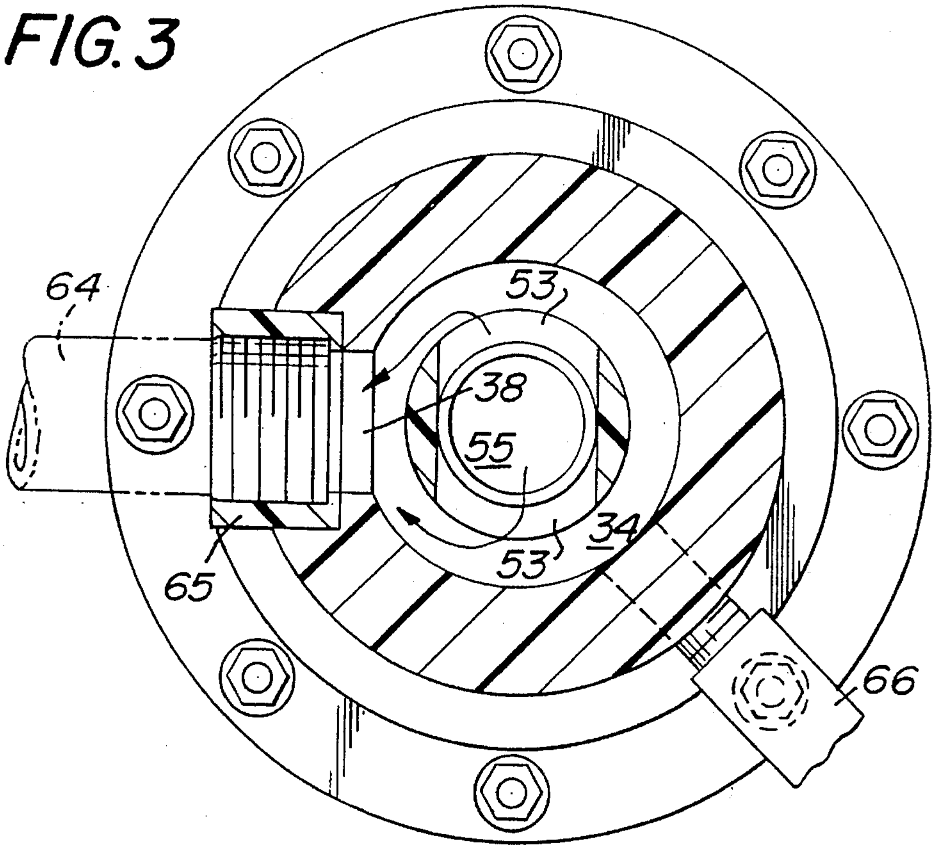
FIG. 3 is a sectional view taken along lines 3—3 of FIG. 2.
Figure 4:
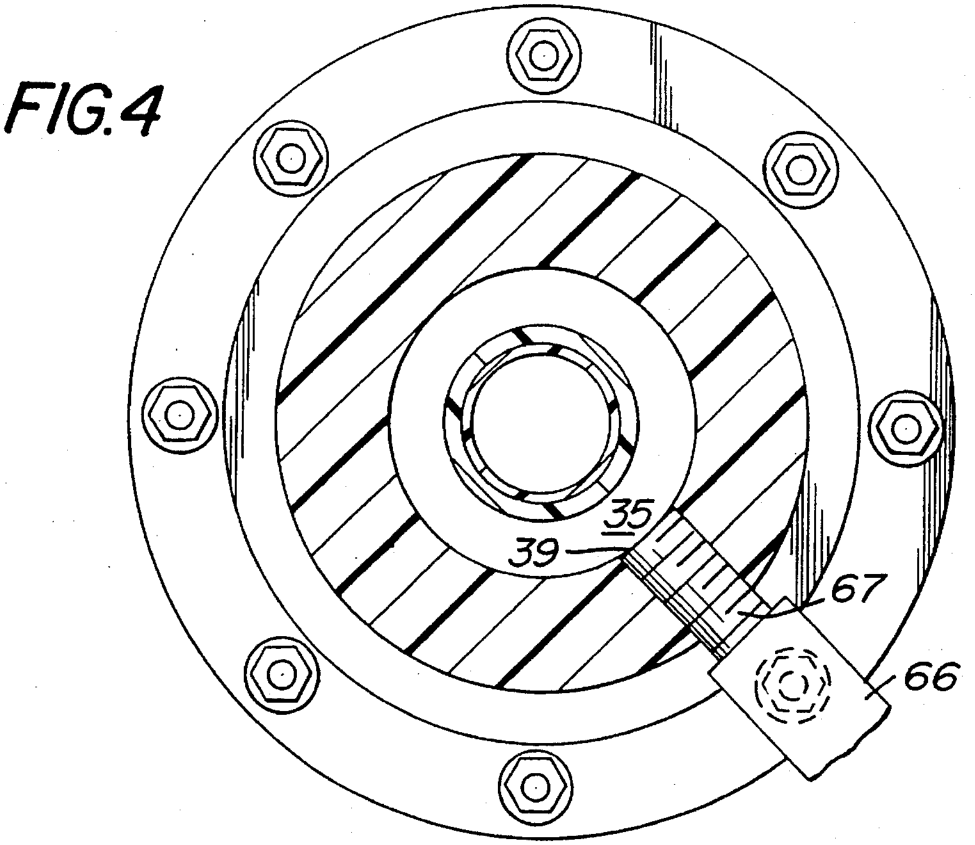
FIG. 4 is a sectional view taken along lines 4—4 of FIG. 3.

Also as shown in FIG. 2, pivotable liquid outlet means 22 is a conduit having a first bore 35, a second bore 34, a first end 37, a second end 36 and a mid-portion 40. Second bore 34 is in fluid communication with liquid outlet port 38 as shown in FIGS. 2 and 3. First bore 35 is in fluid communication with pressure relief port 39 as shown in FIG. 4. First bore 35 is also in fluid communication with bore 24 of container attachment means 21.

Circumference 41 of first end 37 is larger than circumference 72 of mid-portion 40 thereby forming a step 42. First end 37 of outlet means 22 is joined to second end 26 of attachment means 21 by circular clamp 43. Clamp 43 attaches to circumference 30 of second end 26 of attachment means 21 and to circumference 41 of first end 37 of outlet means 22. Loosing of bolts 44 in nuts 45 allows outlet means 22 to be pivoted 360° in either clockwise or counterclockwise directions about the central axil point of adjoining bores 35 and 24 to facilitate alignment of outlet and pressure relief ports with outlet and pressure relief piping. Second end 26 of attachment means 21 has a groove 47 in which gasket 18 is disposed. Gasket 18 seals the junction of end 26 to end 37. The circumference 46 of second end 36 of outlet means 22 is threaded.

Diffuser means 23 is comprised of a disc 48 and a diffuser 54. Disc 48 has a recess 49 with threaded walls 50. The center of the recess has a tubular member 51 with a threaded end portion 52, a plurality of orifices 53, a chamber 55 and a baffle 56. Baffle 56 separates second bore 34 from first bore 35 and forms a seal at shoulder 70. Diffuser 54 is a tubular member having a threaded second end 57, a sealed first end 58 and a sieve body portion 59. Threaded second end 57 of diffuser 54 is threadably attached to threaded end portion 52 of tubular member 51. Threaded walls 50 of disc 48 are threadably attached to threaded circumference 46 of second end 36 of outlet means 22. Recess 49 has a groove 77 containing gasket 78. Gasket 78 seals the juncture of disc 48 and second end 36 of outlet means 22.

Apparatus.20 is particularly well suited for dispensing of liquids from a container containing solid materials, a portion of which are dissolved in the liquid. With reference to FIGS. 1 and 2, in order to fill container 11 with solid material, water flow through inlet 12 is terminated. Diffuser means 23 is removed from outlet means 22 by unscrewing disc 48 from threaded walls 50 of outlet means 22 and removing diffuser means 23 from bores 24, 34 and 35. Diffuser body 59 can then be inspected for sieve damage and plugging and can be replaced if needed. A plurality of threaded rods 73 in plurality of orifices 74 enable disc 48 to be unthreaded from dispensing means 22 without the use of tools. Metal reinforcing band 75 encircles walls 50 to ensure the seal between disc 48 and dispensing means 22 remains tight. Solid halogen donor material is then poured into container 11 through bores 34 and 35 of attachment means 22 and bore 24 of attachment means 21 attached to orifice 13 of container 11. Diffuser means 23 is then reattached to outlet means 22 by threading disc 48 to threaded walls 50 and water flow is then restarted through inlet 12. As water is input into container 11, the water level rises the entire height within the container and dissolves a portion of the solid halogen donor material within the container cavity. Since the only outlet for the water containing the dissolved solid is through orifice 13 via diffuser body 59, the cavity 80 and the solid within the cavity 80 is flooded regardless of the fill height of solid material within container 11. It is important to note that orifice 13 to which apparatus 20 is attached must be located atop container 11 to ensure that the entire volume of container 11 is filled with liquid before any liquid can exit orifice 13 through apparatus 20. This ensures that container 11 is flooded and solid material within container 11 is immersed at all times regardless of the amount of solid material within container 11.

With reference to FIGS. 1–3, once container 11 is flooded, liquid within container 11 flows under pressure of fresh liquid from inlet 12 into diffuser body 59, into chamber 55, out plurality of orifices 53, into bore 34, out port 38, past fitting 65 into pipe 64, past fitting 60, into pipe 14, past vacuum breaker 62, and into pipe 71 from where it enters the system which is to be treated with halogen.

When liquid flow into container 11 is terminated, container 11 is protected from siphoning of liquid through pipe 71 by vacuum breaker 62. Container 11 is also protected from pressure surges within tank 11 by pressure relief port 39 and pressure relief valve 66. If diffusing means 23 becomes plugged with undissolved solid material causing pressure increases within cavity 80, which exceeds the valve pressure of pressure relief valve 66, liquid will bleed from container 11 through pipe 67 in port 39, pass through pressure relief valve 66, through fitting 61 and out drain pipe 63 which drains into a sewer or a collection basin as shown in FIGS. 1, 2 and 4.

Thus the instant invention provides a liquid dispensing apparatus for attachment to a container in which solid material within the container is always flooded and in which a liquid diffuser within the container is accessible for removal inspection and replacement. The invention is particularly well suited to attach to a solid halogen donor dispensing container to dispense liquid containing dissolved halogen donor from the container.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A liquid dispensing apparatus for dispensing liquid from a container, said apparatus comprising:

a) a container attachment means having a bore;

b) a pivotable liquid outlet means removably attached to said container attachment means, said pivotable liquid outlet means having a first and a second bore, a liquid outlet port in fluid communication with said second bore and a pressure relief port in fluid communication with said first bore, said first bore in fluid communication with said bore of said container attachment means; and c) a diffuser means removably attached to said pivotable liquid outlet means and disposed within said bore of said container attachment means and within said first and said second bores of said pivotable liquid outlet means, said diffuser means providing fluid communication from said first bore to said second bore of said pivotable liquid outlet means;

wherein said diffuser means is removable from said pivotable outlet means to facilitate diffuser means inspection and replacement.

2. The apparatus of claim 1 wherein said pivotable liquid outlet means is pivotable 360° about said first and second bores of said pivotable liquid outlet means and said bore of said container attachment means.

3. The apparatus of claim 2 wherein said liquid outlet port of said pivotable liquid outlet means is removably connected to a vacuum breaker.

4. The apparatus of claim 3 wherein said pressure relief port of said pivotable liquid outlet means is removably connected to a pressure relief valve.

5. The apparatus of claim 2 wherein said pivotable liquid outlet means is secured to said container attachment means by a ring clamp.

6. A liquid dispensing apparatus for dispensing liquid from a container containing a liquid and a solid halogen donor material, said apparatus comprising:

a) a container attachment means having a bore;

b) a pivotable liquid outlet means, removably attached to said container attachment means, said pivotable liquid outlet means having a first and a second bore, a liquid outlet port in fluid communication with said second bore and a pressure relief port in fluid communication with said first bore, said first bore in fluid communication with said bore of said container attachment means, said liquid outlet port removably connected to a vacuum breaker, said pressure relief port removably connected to a pressure relief value, said pivotable liquid outlet means secured to said container attachment means by a ring clamp wherein said pivotable liquid outlet means is pivotable about said first and second bores of said outlet means and said central bore of said container attachment means; and c) a diffuser means removably attached to said pivotable liquid outlet means and disposed within said bore of said container attachment means and within said first and said second bores of said pivotable liquid outlet means, said diffuser means providing fluid communication from said first bore to said second bore of said pivotable liquid outlet means;

wherein liquid flowing into the container from a liquid inlet completely floods the solid halogen donor material and dissolves a portion of the solid halogen donor material, flows through and is filtered by said diffuser means, flows from said diffuser means into said second bore of said pivotable liquid outlet means, and is dispensed from said second bore through said liquid outlet port, and wherein said diffuser means is removable from said pivotable outlet means to facilitate said diffuser means inspection and replacement.

* * * * *